(12) United States Patent
Corbille et al.

(10) Patent No.: US 12,487,426 B2
(45) Date of Patent: Dec. 2, 2025

(54) CABLE ATTACHMENT DEVICE

(71) Applicant: Corning Research & Development Corporation, Corning, NY (US)

(72) Inventors: Christophe Joseph Marie Corbille, Saint Nicolas de Redon (FR); Frédéric Pierre Le Riche, Coueron (FR); Michel Teva Menguy, La Chevallerais (FR)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 342 days.

(21) Appl. No.: 17/989,167

(22) Filed: Nov. 17, 2022

(65) Prior Publication Data
US 2023/0168458 A1 Jun. 1, 2023

Related U.S. Application Data

(60) Provisional application No. 63/284,088, filed on Nov. 30, 2021.

(51) Int. Cl.
*G02B 6/44* (2006.01)
(52) U.S. Cl.
CPC .................... *G02B 6/4471* (2013.01)
(58) Field of Classification Search
CPC .................... G02B 6/44; G02B 6/4471
See application file for complete search history.

(56) References Cited

U.S. PATENT DOCUMENTS

| | | | | |
|---|---|---|---|---|
| 11,460,655 | B2 * | 10/2022 | Corbille | G02B 6/44775 |
| 2007/0025677 | A1 * | 2/2007 | Harrison | G02B 6/44765 |
| | | | | 385/134 |

(Continued)

FOREIGN PATENT DOCUMENTS

| | | |
|---|---|---|
| EP | 2856233 B1 | 2/2021 |
| FR | 2982039 A1 | 5/2013 |

(Continued)

OTHER PUBLICATIONS

European Patent Application No. 22209735.4, Extended European Search Report dated Apr. 26, 2023; 7 pages; European Patent Office.

*Primary Examiner* — Tina Wong
(74) *Attorney, Agent, or Firm* — Tamika A. Crawl-Bey

(57) ABSTRACT

A cable attachment device for sealing and retaining a communications cable entering a telecommunications closure through an opening defined in the closure is disclosed, the device comprising: a housing having a passage through which the communications cable extends, the housing having a first portion and a second portion; wherein the first portion of the housing is configured to receive a protective tube of the telecommunications cable; wherein the second portion of the housing is configured to engage with the closure; a first seal configured to form a seal between the device and the closure; a second seal configured to form a seal between the interior of the device and the protective tube; a third seal configured to seal between the communications cable and the interior of the device; a first retaining arrangement configured to couple the device to the closure; a second retaining arrangement configured to hold the tube relative to the device; and a third retaining arrangement configured to fix the telecommunications cable relative to the device.

20 Claims, 9 Drawing Sheets

(56) References Cited

U.S. PATENT DOCUMENTS

2011/0033157 A1\* 2/2011 Drouard ............... H01R 13/743
                                                                                                  174/655
2014/0304970 A1    10/2014  Claessens et al.

FOREIGN PATENT DOCUMENTS

| WO | 2013/174992 A1 | 11/2013 |
|---|---|---|
| WO | 2014/106609 A1 | 7/2014 |

\* cited by examiner

CABLE ATTACHMENT DEVICE

CROSS-REFERENCE TO RELATED APPLICATION

The present application claims priority to U.S. Provisional Application No. 63/284,088, filed Nov. 30, 2021, the entirety of which is incorporated herein by reference.

BACKGROUND

The present disclosure relates to a cable attachment device for inserting a telecommunication cable containing optical fibers, copper wires or coax cable into a telecommunications enclosure, for example into a terminal closure, pre-stubbed terminal, optical network terminal or other junction box.

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunication enclosure to protect the exposed interior of the cable. The cable branches may be further distributed until the network reaches individual homes, businesses, offices, and so on. These networks are often referred to as fiber to the X (FTTX) networks which can include fiber to the premise (FTTP), fiber to the home (FTTH) and fiber to the antenna (FTTA) networks.

In an FTTH network, optical fiber is brought to the end user and connected to the optical network terminal (ONT) unit mounted on a wall at the end user. The ONT converts this optical signal into conventional electrical signals to provide voice (telephone), Internet (data) and video signals to the end user.

Blown Fiber is a technology used to deploy FTTH in many countries. Protective tubes or ducts are lain in the ground and the fiber-optic cables are then installed by being blown through the protective tube by a medium such as air or water.

Fiber terminals are one type of telecommunication enclosure that is typically located near an end user in a FTTP network to distribute the final service to the end user. Typical fiber terminals are designed to drop services (to provide service connections) to a small number of premises having typically between four to twelve end users. The last service connection from the fiber terminal is made to the ONT, located at the end user using a drop cable. Typically, an optical connector attached to the terminal end of an optical fiber of the cable is preferred to allow quick, reliable field installation.

A first example method of introducing a fiber-optic cable into a telecommunication enclosure is to provide a gas block or water block type connector at or near a wall of the telecommunication closure which separates the cable from the tube through which it is blown, and forms an interface between the cable and the interior of the closure. A protective tube or duct surrounding the fiber-optic cable is fed into one end of the connector and the exposed cable is fed out of the other end of the device and into the closure. This method has a number of drawbacks such as leaving a portion of exposed cable between the connector and the closure which can easily become damaged during routine maintenance work. Connectors known in the art are also bulky and take up a significant amount of space where multiple connections are needed into a closure.

A second example method of introducing a fiber-optic cable into a telecommunication enclosure is to feed a protective tube or duct surrounding a fiber-optic cable directly into a closure. However, with this method, the cable is not fixed relative to the closure. This can lead to movement of the cable within the closure, which can lead to the fibers becoming damaged. Additionally, the sealing between the cable and the tube is not adequate, and moisture can penetrate into the tube.

Therefore, it would be desirable to provide an interface between the tubes, in which the fiber-optic cables are passed, and a terminal closure, pre-stubbed terminal, optical network terminal or other junction box, which is compact and adequately protects and retains the cables.

SUMMARY

The invention is defined in the independent claim, to which the reader is now directed. Preferred or advantageous features are set out in the dependent claims.

According to a first aspect, a cable attachment device for sealing and retaining a communications cable entering a telecommunications closure through an opening defined in the closure is provided, the device comprising a housing, having a passage through which the communications cable extends, the housing having a first portion and a second portion; wherein the first portion of the housing is configured to receive a protective tube of the telecommunications cable; wherein the second portion of the housing is configured to engage with the closure; a first seal configured to form a seal between the device and the closure; a second seal configured to form a seal between the interior of the device and the protective tube; a third seal configured to seal between the communications cable and the interior of the device; a first retaining arrangement configured to couple the device to the closure; a second retaining arrangement configured to hold the tube relative to the device; and a third retaining arrangement configured to fix the telecommunications cable relative to the device.

This arrangement provides the advantages of a gas block or water block type connector with those of a direct connector into a closure. In particular, this device provides a watertight solution which seals between the closure and the device, between the device and the tube and between the tube and the cable housed within. The device also prevents unwanted movement of the tube and cable by fixing both the tube and the cable within the device which can lead to damage of the fibers or other components. The second retaining arrangement which retains the tube within the device provides the advantage of the tube being able to remain in place if the cable needs to be replaced. The second portion may be partially received in the closure. Alternatively, the second portion may be fully received in the closure. The second retaining arrangement may still permit some movement of the tube relative to the device, such as rotational movement.

Optionally, the first seal circumscribes an outer surface of the second portion of the device housing.

This arrangement can advantageously enable good sealing between the device and the closure as it is the second portion of the device which is received in the opening of the closure. Providing the seal on an outer surface of the device rather than in the opening of the closure can help to make routine maintenance operations easier for an operator. This is because the seal can be more easily replaced in case of failure. Additionally, the cable attachment devices are intended to be replaced more often than a closure, meaning that the seal is replaced more frequently. Providing the seal as an integral part of the attachment device also reduces the operations needed to be made by an operator assembling the device in the closure.

Optionally, the second seal circumscribes the protective tube.

Optionally, the passage of the first portion of the housing is configured to receive the second seal.

Optionally, the third seal circumscribes the communications cable.

Optionally, the first retaining arrangement is arranged on the second portion of the device housing.

With this arrangement, when the device and the closure are connected, the retaining arrangement is received in the closure. This has the advantage of the retaining arrangement being more secure and less likely to be unintentionally disengaged when other attachment devices are being connected or disconnected.

Optionally, the first retaining arrangement comprises one or more resilient members that releasably engage with the closure.

This can allow the attachment device to be releasably connected to the closure. This can make assembly and disassembly easier, as well as providing an operator with more options for routine maintenance operations.

Optionally, the passage of the first portion of the housing is configured to receive the second retaining arrangement.

Optionally, the second retaining arrangement releasably engages with the tube.

This can allow the tube to be removed if replacement of the tube or attachment device is required.

Optionally, when the second retaining arrangement is engaged, removal of the tube is not possible.

Optionally, when the second retaining member is engaged, the tube is able to rotate relative to the device.

This can advantageously allow the attachment device to be rotated in the closure without creating torsion in the tube. This is also advantageous for the assembly of the attachment device, where portions of the device have threaded connections and rotation of the portions is required.

Optionally, the device further comprises a second retaining member release mechanism which is configured to disengage the second retaining arrangement.

Optionally, when the second retaining arrangement is disengaged removal of the tube from the device is possible.

Optionally, the second retaining arrangement comprises a plurality of spaced apart resilient fingers.

Optionally, the protective tube is a duct for blown fiber and the communications cable is installed by being blown through the protective tube by a medium such as air or water.

Optionally, when the protective tube of the telecommunications cable is fully received in the first portion of the housing, the protective tube extends only part of the way through the passage of the housing.

Optionally, the device housing further comprises a mechanical stop configured to abut an end of the protective tube of the communications cable to prevent the tube from passing all of the way through the passage of the housing.

Optionally, the device is configured to seal and retain a communications cable comprising an outer sheath, a strength member and one or more optical fibers, the strength member and the one or more optical fibers being enclosed within the outer sheath.

Optionally the strength member may be a central strength member. Alternatively, the strength member may be an aramid fiber.

Optionally, when the communications cable is retained by the cable attachment device, the outer sheath of the cable extends only part of the way through the passage of the device housing such that the strength member of the cable and the one or more optical fibers are beyond the extension of the outer sheath.

Optionally, the third retaining arrangement is configured to retain the exposed strength member of the cable.

Optionally, the fibers are not retained by the third retaining member.

Optionally, the third retaining arrangement is a clamp.

Optionally, the housing comprises an inlet portion, a locknut portion and a gasblock or a waterblock portion.

Optionally, the inlet portion is a separate part to the locknut portion and the gasblock or waterblock portions.

Optionally, the inlet portion is configured to be coupled to the locknut portion at a coupling point.

Optionally, the locknut portion has a shape which corresponds to the shape of the opening of the telecommunications closure such that the coupling point is configured to be received in the opening of the closure.

Optionally, the inlet portion and the locknut portion are unable to be uncoupled from one another when the coupling point is received in the opening of the closure.

Optionally, the locknut portion and the gasblock or waterblock portion are separate parts of the housing.

Optionally, the inlet portion comprises a compressible member, and wherein the third seal is configured to be received in a bore of the compressible member.

Optionally, the locknut portion comprises a compression member; and wherein, when the locknut portion is coupled to the inlet portion, the compression member engages with the compressible member to reduce the cross section of an opening of the compressible member and compress the third seal, forming the seal between the communications cable and the interior of the device.

Optionally, the locknut portion and the inlet portion are coupled to one another by a threaded connection.

Optionally, the threaded connection between the first part and the second part is established between an external thread on the locknut portion and an internal thread on the inlet portion.

Optionally, the device further comprises a fourth seal configured to seal between the interior of the tube and the interior of the device.

Optionally, the fourth seal is a plug configured to be mounted to the end of the tube; and the fourth seal comprises a channel through which the cable can be passed.

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to like components or parts.

Figure 1:
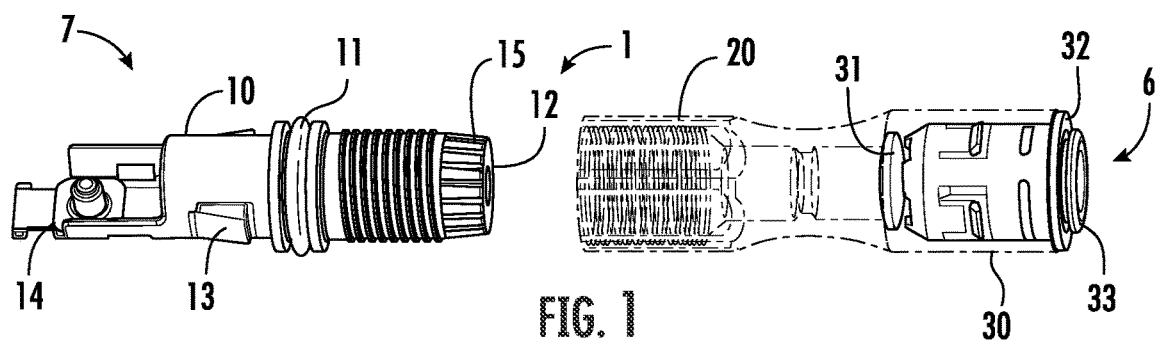
FIG. 1 is an exploded perspective view of an exemplary attachment device according to an embodiment of the invention.

FIG. 1 is an exploded view of an exemplary cable attachment device 1 according to an embodiment of the invention. The cable attachment device 1 housing has a first portion 6 and a second portion 7. The first portion 6 of the housing is configured to receive a protective tube of a telecommunications cable and the second portion of the housing is configured to engage with a telecommunications closure (not shown). The cable attachment device can also be divided into an inlet portion 10, a locknut portion 20 and a gasblock or waterblock portion 30. The inlet portion 10, locknut portion 20 and gasblock or waterblock portion 30 each have a respective central bore or passage. The device 1 has a first seal 11 on an outer surface of the inlet portion 10, configured to form a seal between the device 1 and the telecommunications closure. The first seal 11 is in the form of a gasket. The device 1 has a second seal 31 received in the gasblock or waterbock portion 30, configured to form a seal between the interior of the device 1 and the protective tube of the communications cable to be received in the device 1. The second seal 31 is in the form of a gasket. The device has a third seal 12 received in an end of the inlet portion 10, configured to seal between the communications cable and the interior of the device 1. The end of the inlet portion 10 has a number of resilient arms 15 that circumscribe the third seal 12 when it is inserted in the end of the inlet portion 10.

The third seal 12 is in the form of a gasket. The device 1 further has a first retaining arrangement 13 configured to couple the device to the closure; a second retaining arrangement (not shown) configured to hold the tube relative to the device 1; and a third retaining arrangement 14 configured to fix the telecommunications cable relative to the device 1. The first retaining arrangement 13 is on the inlet portion 10 which is partially received in an opening of the closure, and is in the form of two resilient arms. The second retaining arrangement is received in the gasblock or waterblock portion 30 of the device 1. The second retaining arrangement will be described in more detail in relation to FIGS. 2 and 3. The third retaining member 14 is on the inlet portion 10 of the device 1 and is a clamp in this example. The third retaining member 14 will be described in more detail in relation to FIGS. 15 and 16.

Figure 2:
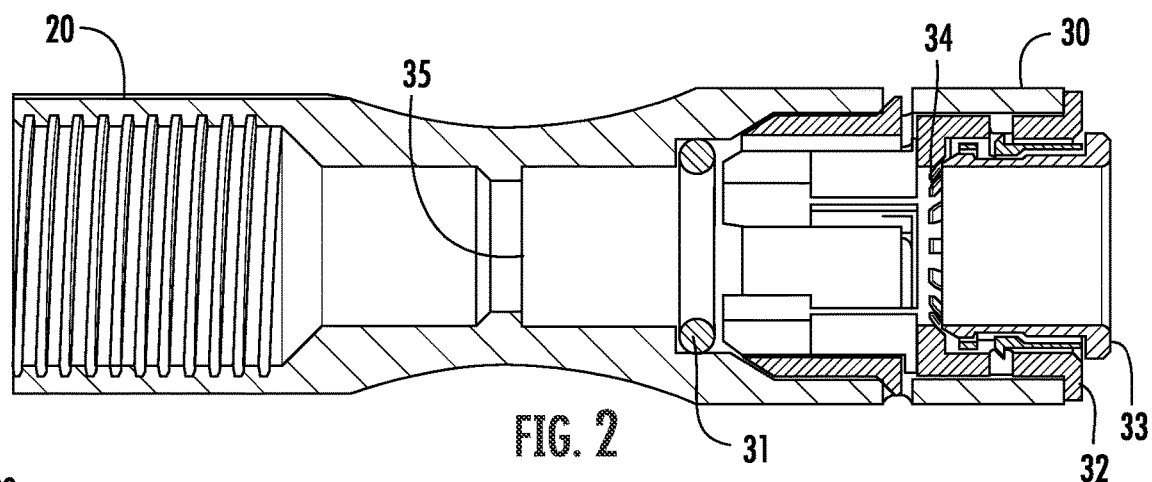
FIGS. 2 and 3 show cross-sectional views of an assembled and exploded view of an example locknut and gasblock or waterblock portions of the device.
Figure 3:
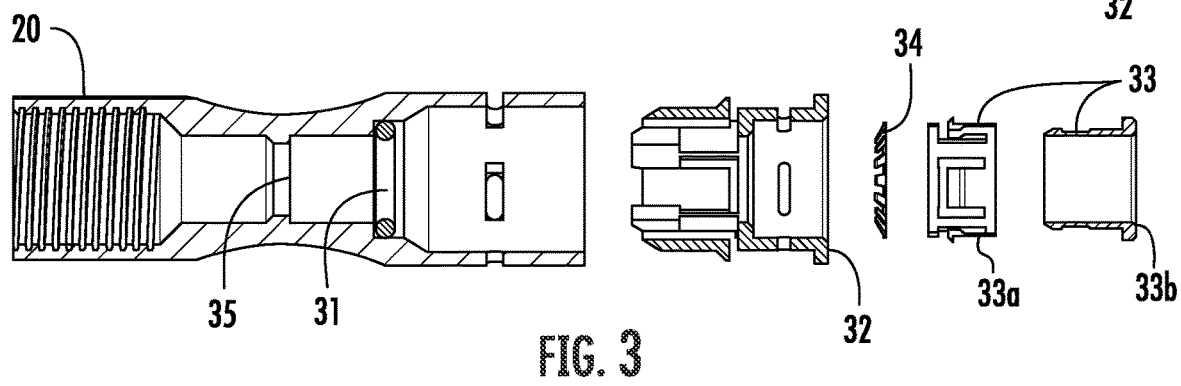

FIGS. 2 and 3 respectively show cross-sectional views of an assembled and exploded view of the locknut portion 20 and gasblock or waterblock 30 portion of the device 1. In these views, the second retaining arrangement 34 can be seen. In this example the second retaining arrangement 34 is in the form of a ring with a plurality of resilient fingers which are configured to engage with the protective tube of the cable. An intermediate piece 32 is shown which helps to keep the second seal 31 in place in the gasblock or waterblock portion 30. A guide assembly 33 comprising a first guide piece 33a and a second guide piece 33b is shown which guide the tube into the gasblock or waterblock portion 30. These also help to retain the second retaining arrangement 34 in place in the gasblock or waterblock portion 30 and form the second retaining arrangement 34 release mechanism. A user can push on the second guide piece 33b to deform the resilient fingers of the second retaining arrangement 34 and disengage them from the protective tube of the cable. The gasblock or waterblock portion 30 also has a mechanical stop 35 in the form of a narrowing of the central passage of the gasblock or waterblock portion 30. This mechanical stop 35 serves to stop the tube and prevent the tube from passing completely through the gasblock or waterblock portion 30.

Figure 4:
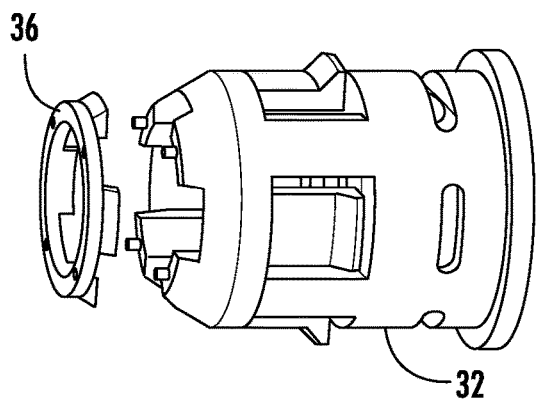
FIGS. 4 and 5 show a perspective view of an example intermediate piece.
Figure 5:
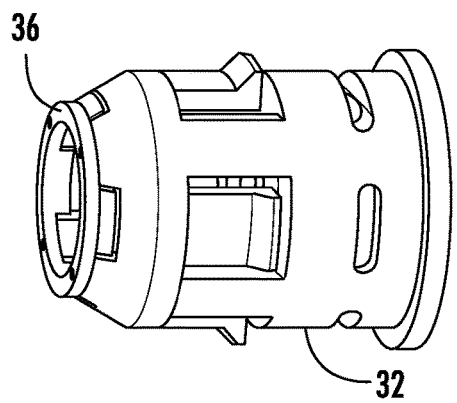

FIGS. 4 and 5 show a perspective view of an example intermediate piece 32. FIGS. 4 and 5 show another example of the intermediate piece 32 with an additional ring 36 which creates a uniform surface at the end of the intermediate piece 32 and helps to locate the second seal 31.

Figure 6:
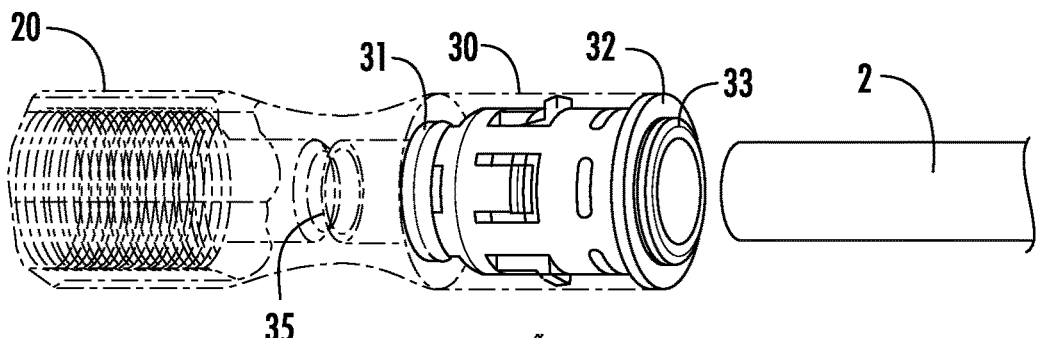
FIGS. 6 to 8 show perspective views of example locknut and gasblock or waterblock portions at different stages of assembly.
Figure 7:
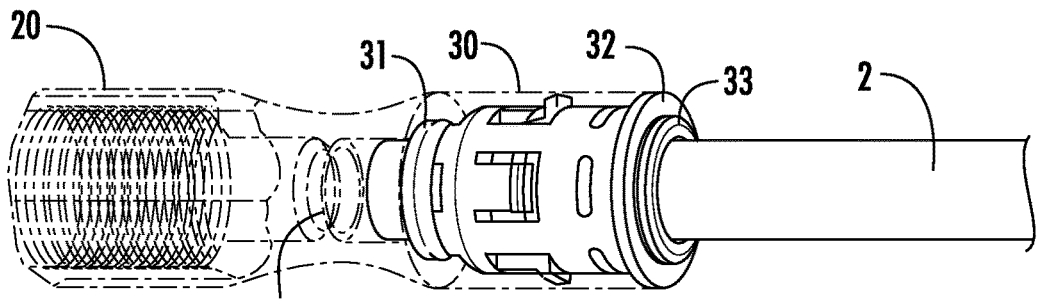
Figure 8:
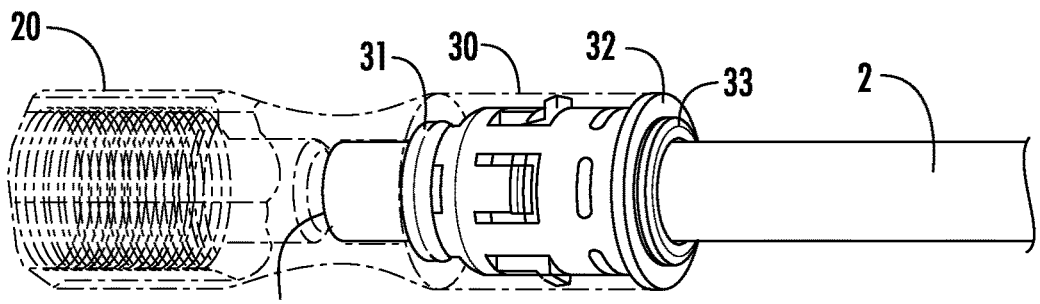

FIGS. 6 to 8 show perspective views of the locknut 20 and gasblock or waterblock portion 30 at different stages of assembly. The tube 2 is inserted into an opening in the guide assembly 33, passes through the intermediate piece 32, the second retaining arrangement 34 and the second seal 31 and abuts the mechanical stop 35.

Figure 9:
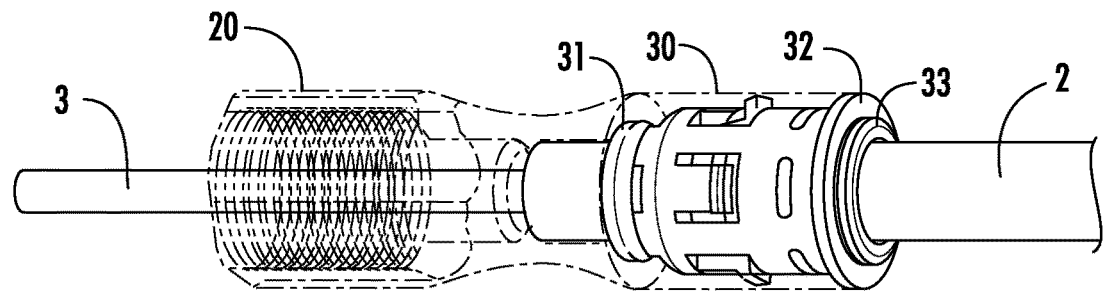
FIGS. 9 to 11 show perspective views of an example cable being assembled in the locknut and gasblock or waterblock portions.
Figure 10:
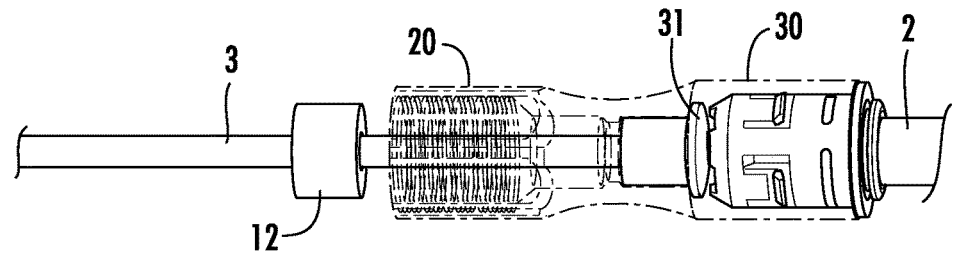
Figure 11:
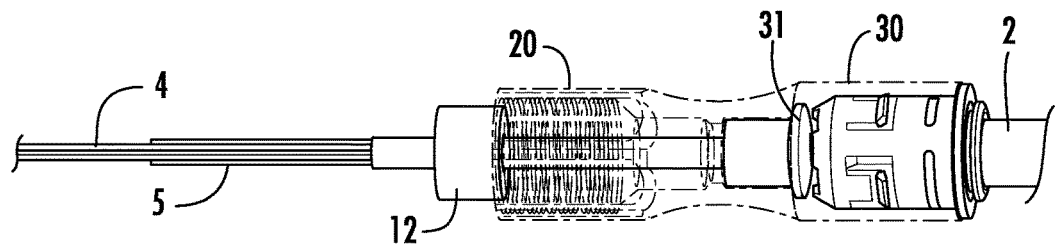

FIGS. 9 to 11 show perspective views of an example cable 3 being assembled in the locknut 20 and gasblock or waterblock portion 30. FIG. 9 shows the cable 3 being blown through the tube 2 in a medium such as air or water. FIG. 10 shows the third seal 12 being placed over the cable 3 such that it circumscribes the cable. FIG. 11 shows the cable 3 with the third seal 12 in place. A portion of the cable outer sheath which has passed through the locknut 20 and gasblock or waterblock portion 30 is stripped back to expose the fibers 4 and a strength member 5 therein. The strength member 5 can be cut down such that only a short length protrudes from the outer sheath of the cable 3.

Figure 12:
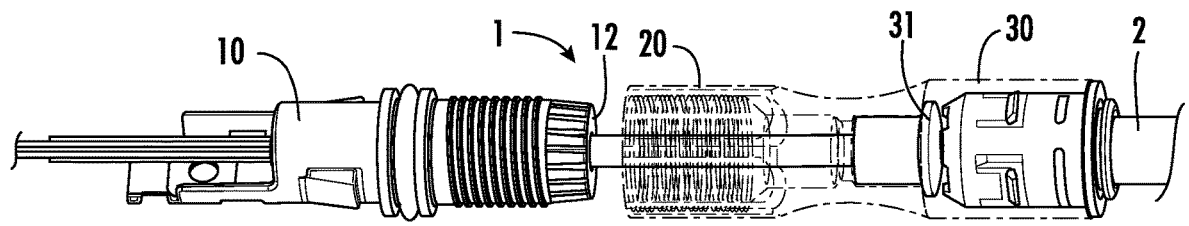
FIGS. 12 to 14 show perspective views of an example inlet portion being assembled with the locknut and gasblock or waterblock portions.
Figure 13:
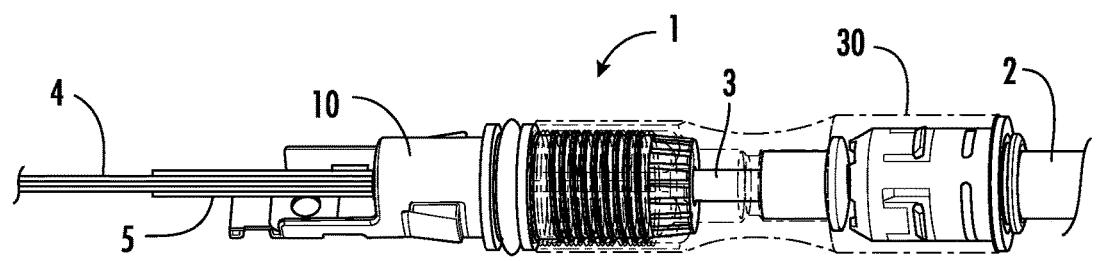
Figure 14:
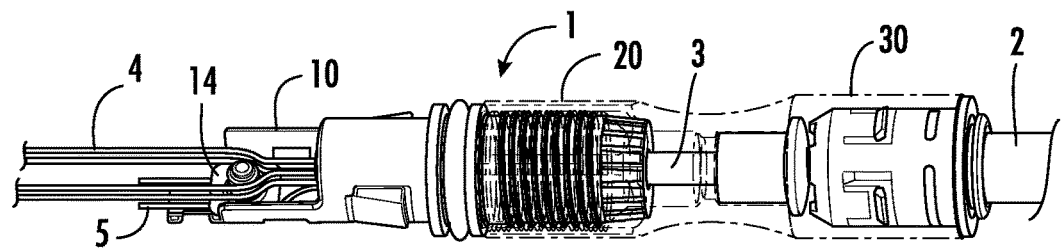

FIGS. 12 to 14 show perspective views of an example inlet portion 10 being assembled with the locknut portion 20 and gasblock or waterblock portion 30. FIG. 12 shows the cable 3 and exposed fibers 4 and strength member 5 of FIG.

11 being passed through the inlet portion 10, and the third seal 3 being inserted into the central bore of the inlet portion 10. FIG. 13 shows the inlet portion 10 assembled to the locknut portion 20 and gasblock or waterblock portions 30 with an external thread of the inlet portion 10 engaged with an internal thread of the locknut portion 20. FIG. 14 shows the third retaining arrangement 14 assembled to the inlet portion 10 and the strength member 5 of the cable retained by this third retaining arrangement 14. In this example, the third retaining arrangement 14 is a clamp. In this Figure, the cable is fully assembled in the cable attachment device.

Figure 15:
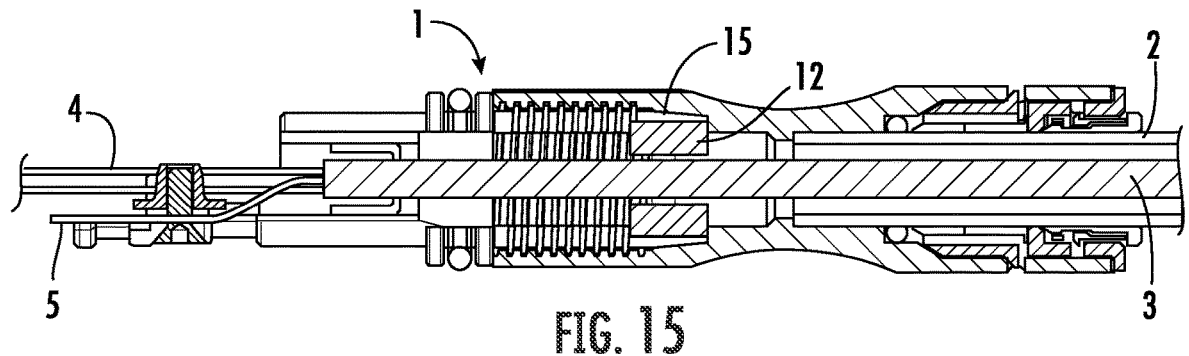
FIGS. 15 to 19 show various views of a second embodiment of the locknut and gasblock or waterblock portions at different stages of assembly with a tube and cable.

FIG. 15 is a sectional view of the fully assembled configuration of FIG. 14. This view reveals how the third seal 12 engages with the cable 3 to seal between the tube 2 and inside the cable 3. The inside of the locknut portion 20 is shaped such that it exerts a force on the resilient arms 15 of the inlet portion to compress the third seal 12. This helps to retain the cable and create the seal between the tube 2 and the inside of the cable 3.

Figure 16:
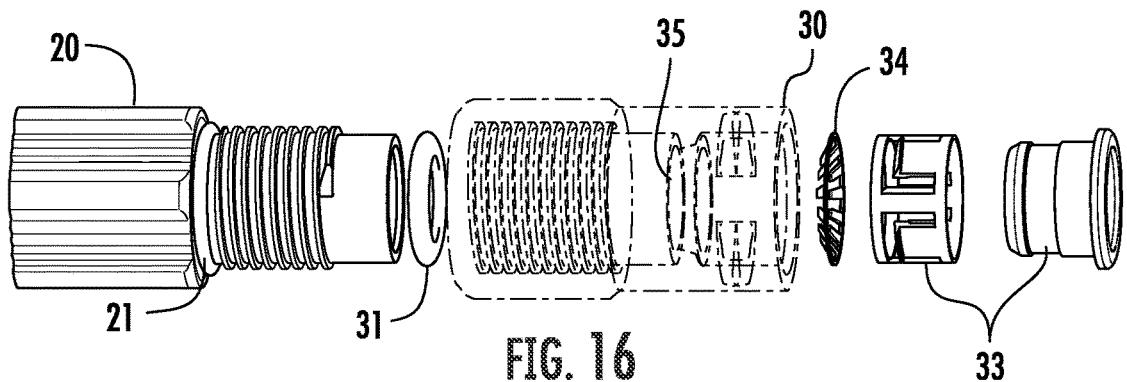
Figure 17:
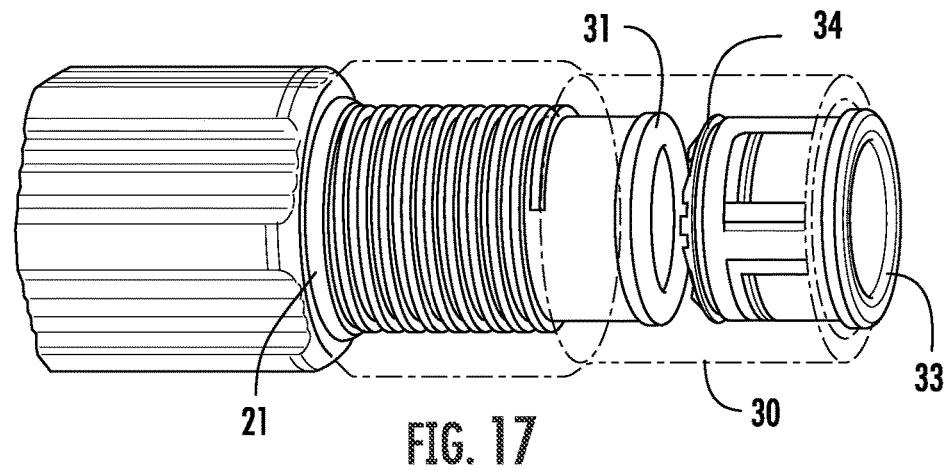
Figure 18:
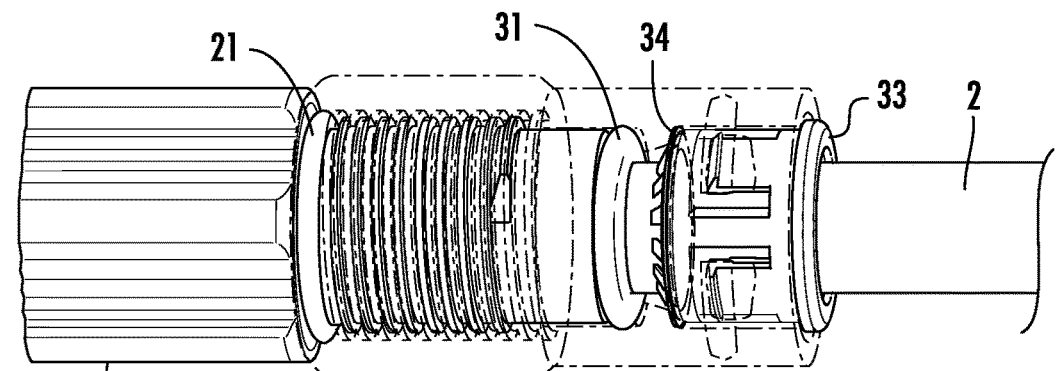
Figure 19:
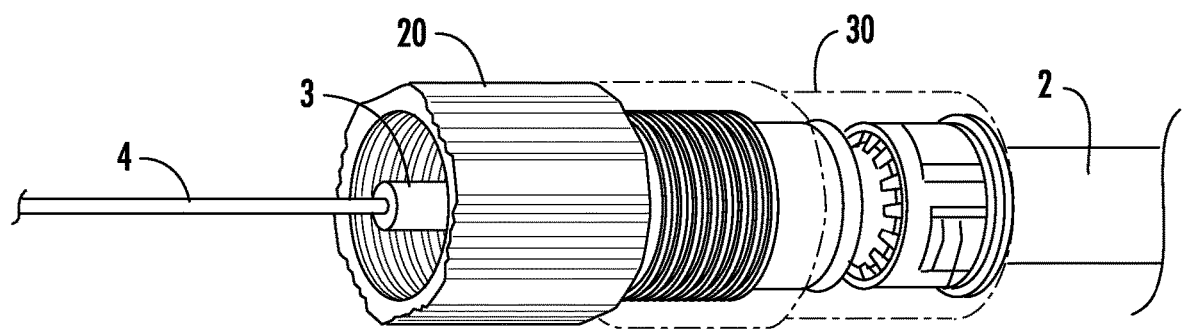

FIGS. 16 to 19 show a second embodiment of the locknut and gasblock or waterblock portions at different stages of assembly with a tube. FIG. 16 is an exploded view of the locknut and gasblock or waterblock portions in which the two portions are separate components. In this example, there is no intermediate piece to hold the second seal 31 in place. In this example, the second seal 31 is placed in between the separate locknut portion 20 and gasblock or waterblock portion 30 and held in place by the threaded engagement of the locknut portion 20 with the gasblock or waterblock portion 30. In this example an additional seal 21 is provided to seal between the body of the locknut portion 20 and the tube 2. The gasblock or waterblock portion 30 of this example also has a mechanical stop 35 to stop the tube 2 from being passed through. FIG. 17 is an assembled perspective view of the locknut portion and gasblock or waterblock portion of FIG. 16. FIG. 18 shows the assembled locknut portion 20 and gasblock or waterblock portion 30 of FIG. 17 with a tube 2 installed. FIG. 19 shows the assembled locknut portion 20 and gasblock or waterblock portion 30 of FIG. 18 with a cable installed and stripped in the same way as is described in relation to the example of FIGS. 9 to 11.

Figure 20:
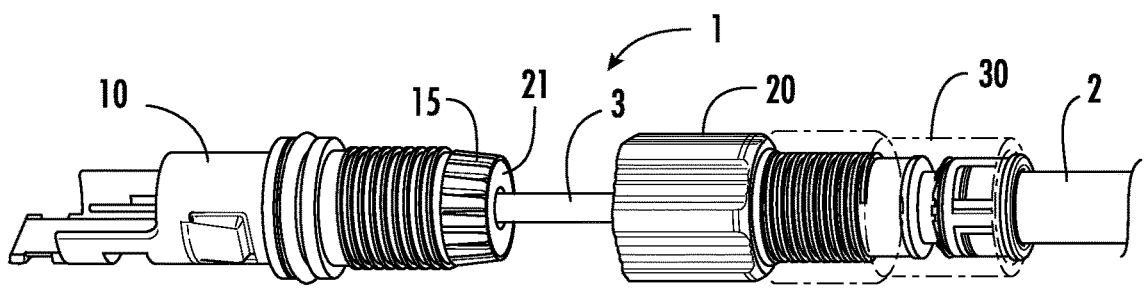
FIGS. 20 to 22 show perspective views the second embodiment of the locknut portion and gasblock or waterblock portions at different stages of assembly with an inlet portion.
Figure 21:
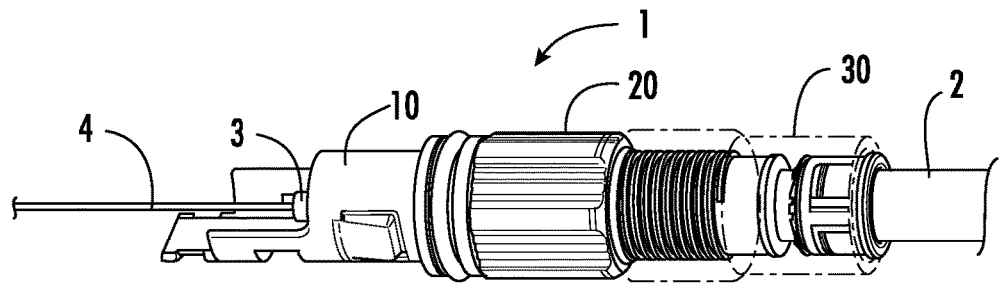
Figure 22:
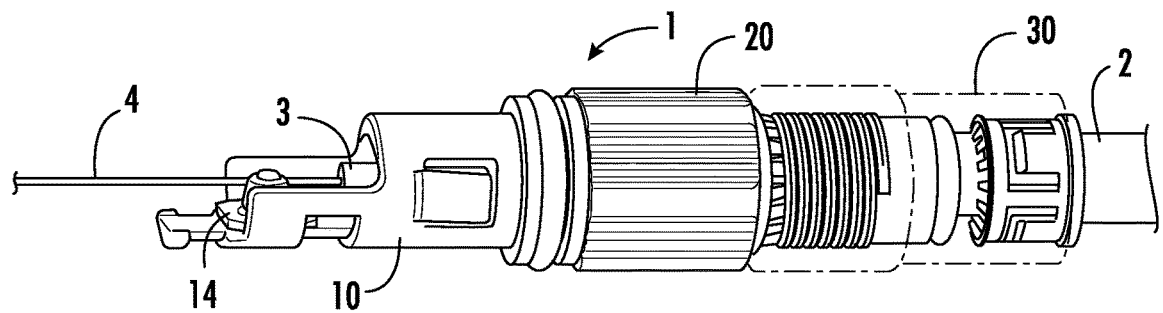

FIGS. 20 to 22 show perspective views of the second embodiment of the locknut portion 20 and gasblock or waterblock portions 30 at different stages of assembly with an inlet portion 10. The steps of the installation of the inlet portion 10 described in relation to FIGS. 12 to 14 correspond respectively to the steps of FIGS. 20 to 22 and, for brevity will not be repeated. The strength member 5 of the cable is omitted from these Figures for simplicity but it will be appreciated that a strength member similar to that of FIGS. 12 to 14 could also be present in this embodiment.

Figure 23:
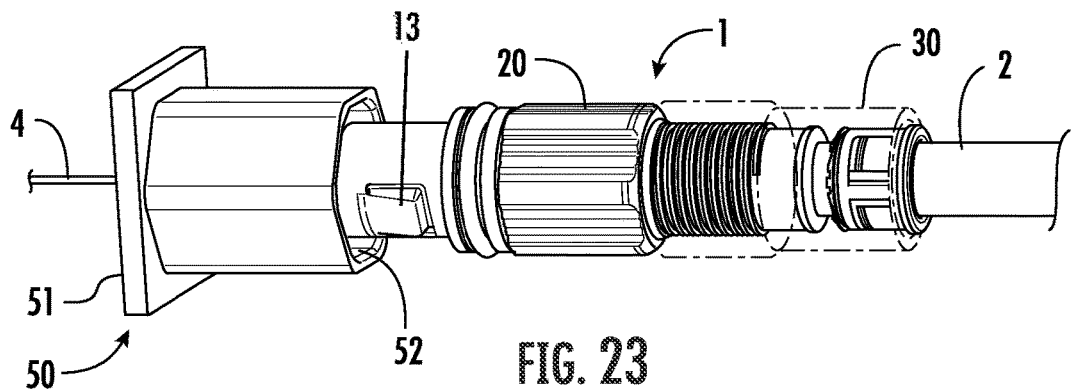
FIGS. 23 to 26 show a cable attachment device being installed in a closure.
Figure 24:
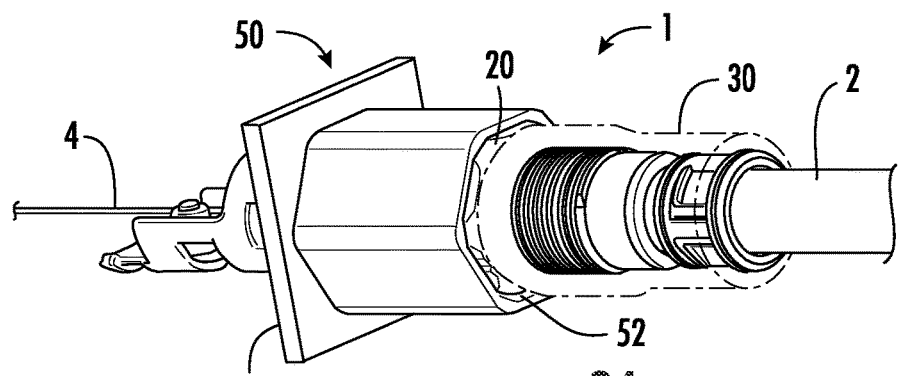
Figure 25:
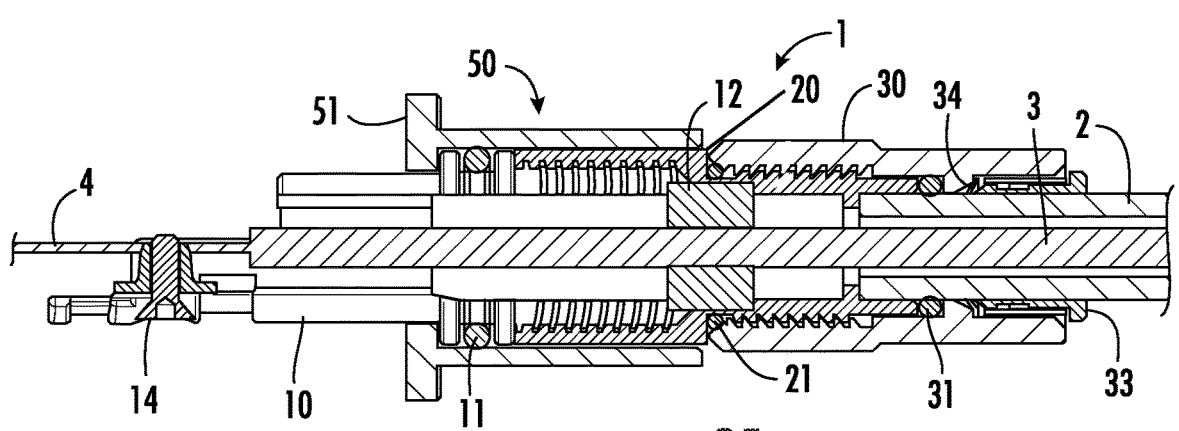
Figure 26:
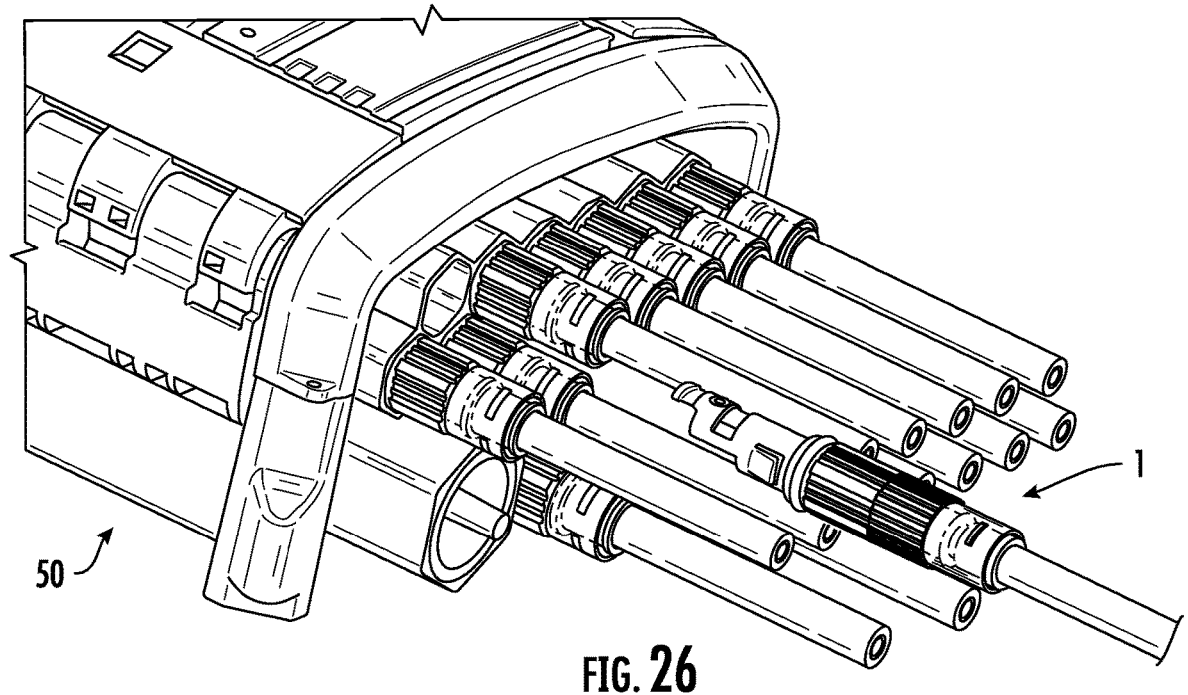

FIGS. 23 to 26 show a cable attachment device 1 according to the second embodiment, being installed in a closure 50. FIG. 23 shows a cable attachment device 1 being installed in a closure 50. A portion of a closure wall 51 is shown, with an opening 52 configured to receive the first portion of the cable attachment device. The first retaining arrangement 13 is configured to engage with an inner surface of the wall 51 of the closure to retain the cable attachment device 1, to retain the device in the closure 50. FIG. 24 shows the cable attachment device 1 coupled to the closure 50. FIG. 25 is a cross sectional view of a cable attachment device 1 installed in a closure 50. This view shows how the first seal 11 forms a seal between the device 1 and the closure 50. FIG. 26 is a perspective view showing a portion of a closure with a number of cable attachment devices 1 installed in openings 52 in the closure 50.

Figure 27:
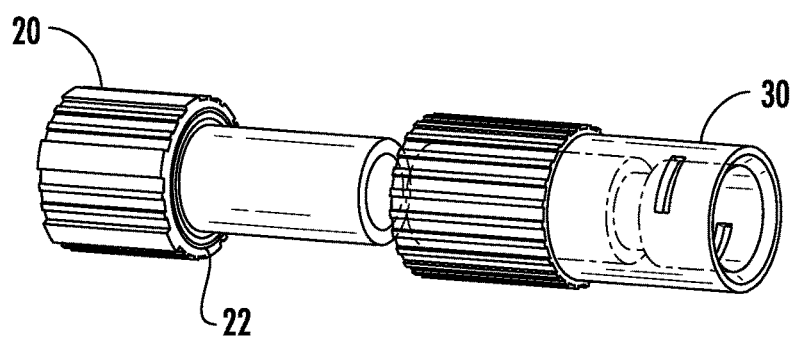
FIGS. 27 and 28 show another example of the second embodiment of the invention in which the locknut portion and the gasblock or waterblock portion are separate but configured to be permanently joined together by ultrasound welding or another suitable joining method.
Figure 28:
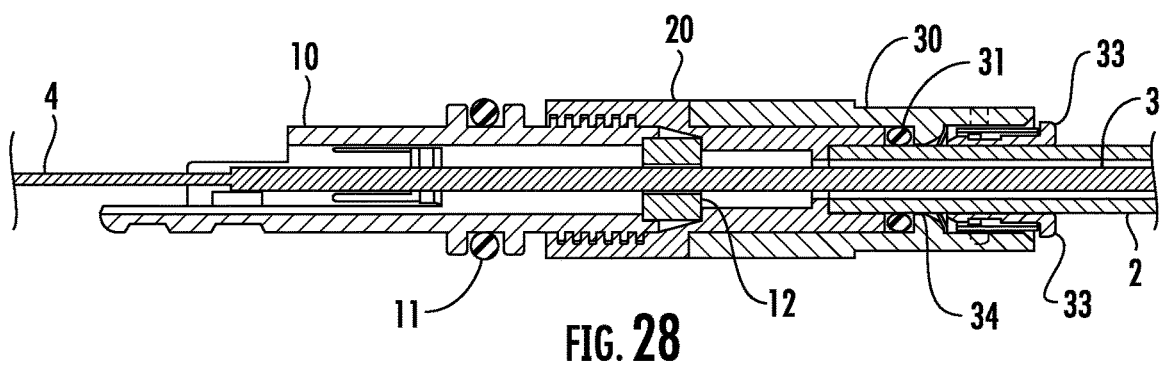

FIGS. 27 and 28 show another example of the second embodiment of the invention in which the locknut portion 20 and the gasblock or waterblock portion 30 are separate but configured to be permanently joined together by ultrasound welding or another suitable joining method. In this example, the locknut portion has an energy director 22 to focus the ultrasonic energy during ultrasonic welding to facilitate joining of the locknut portion 20 and the gasblock or waterblock portion 30.

Figure 29:
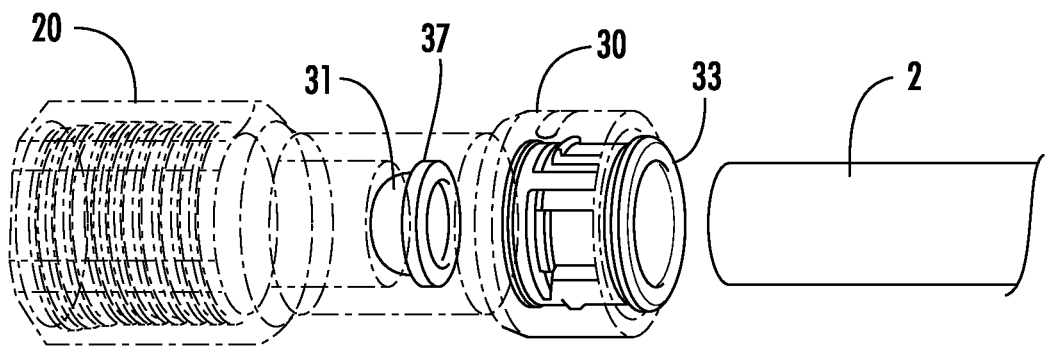
FIGS. 29 to 31 show a third embodiment of the locknut portion and gasblock or waterblock portion at different stages of assembly with a tube.
Figure 30:
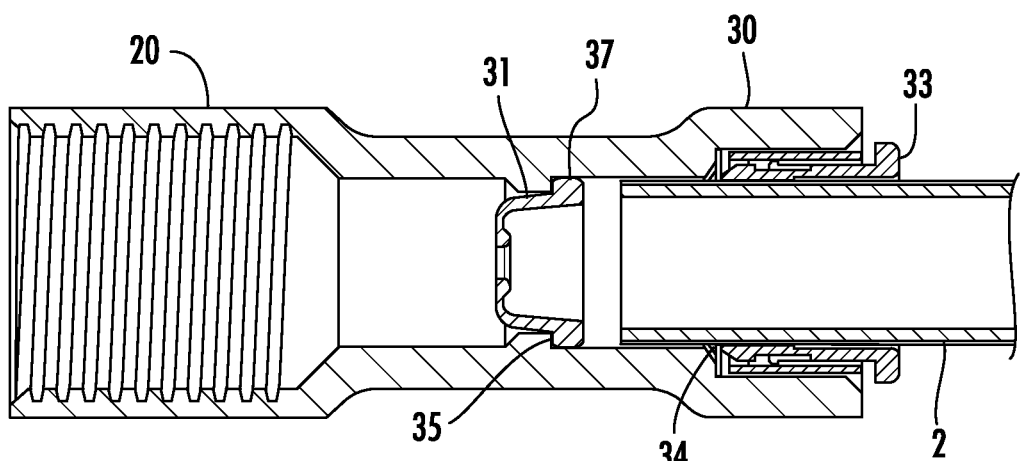
Figure 31:
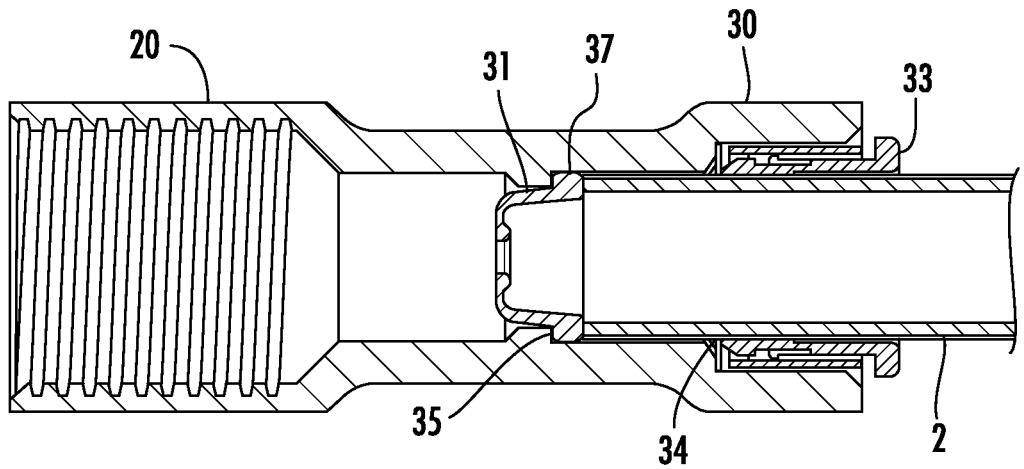

FIGS. 29 to 31 show a third embodiment of the locknut portion 20 and gasblock or waterblock portion 30 at different stages of assembly with a tube 2. In this third embodiment, the second seal 31, provided between the inside of the tube 2 and the cable 3 is in the form of a plug configured to be mounted to the end of the tube 2 and the second seal 31 has a channel through which the cable 3 can be passed. In this example, the locknut portion 20 and the gasblock or waterblock portion 30 form a single component. The second seal also has a flange 37 which engages with a mechanical stop 35 in the gasblock or waterblock portion 30 to stop the tube 2 from being passed through. This embodiment shares most of the features of the second embodiment and, for brevity, these will not be repeated.

Figure 32:
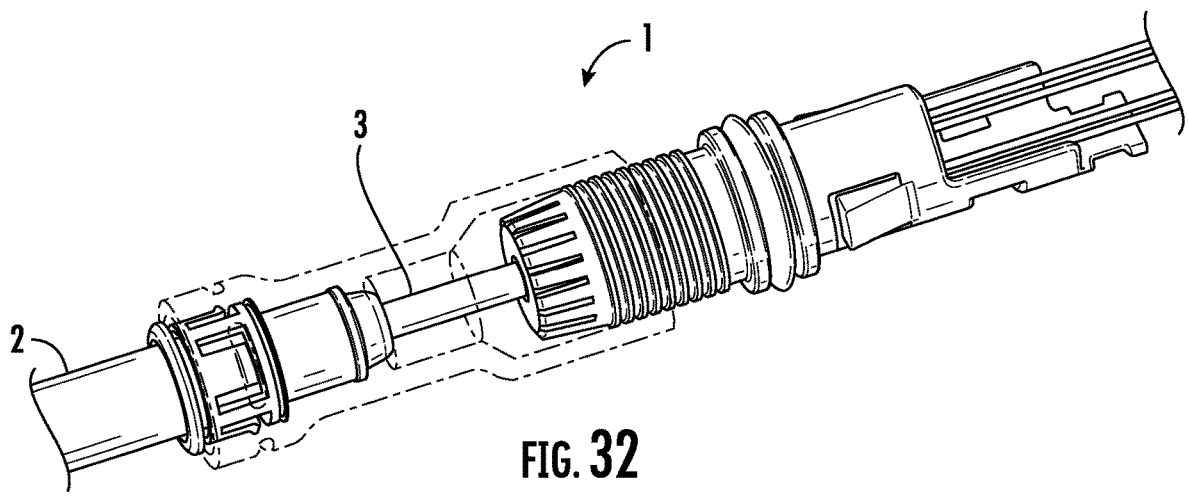
FIGS. 32 to 34 show various views of a third embodiment of the locknut portion and gasdblock or waterblock portion being assembled with the inlet portion.
Figure 33:
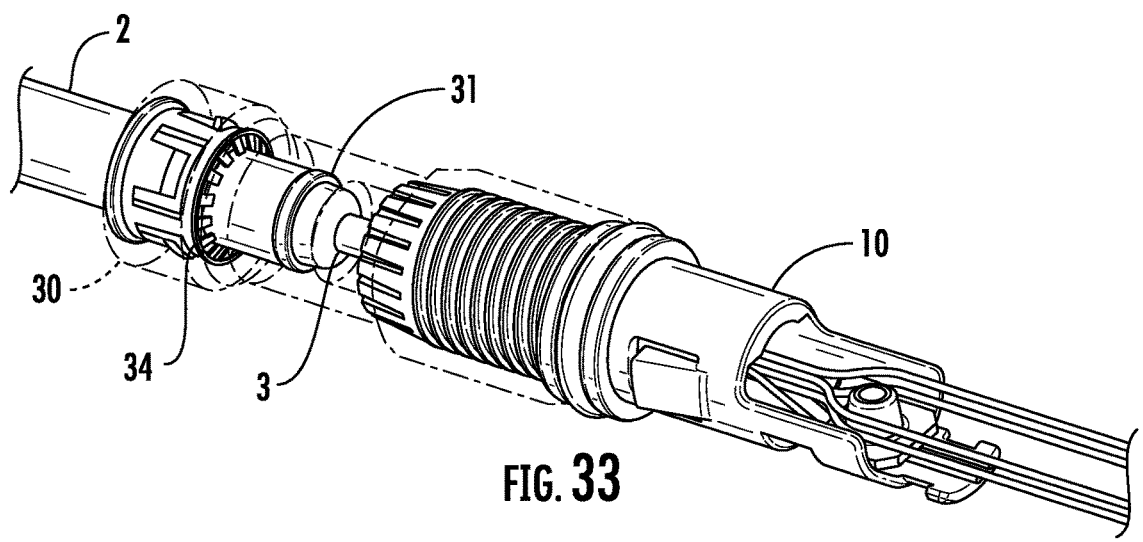
Figure 34:
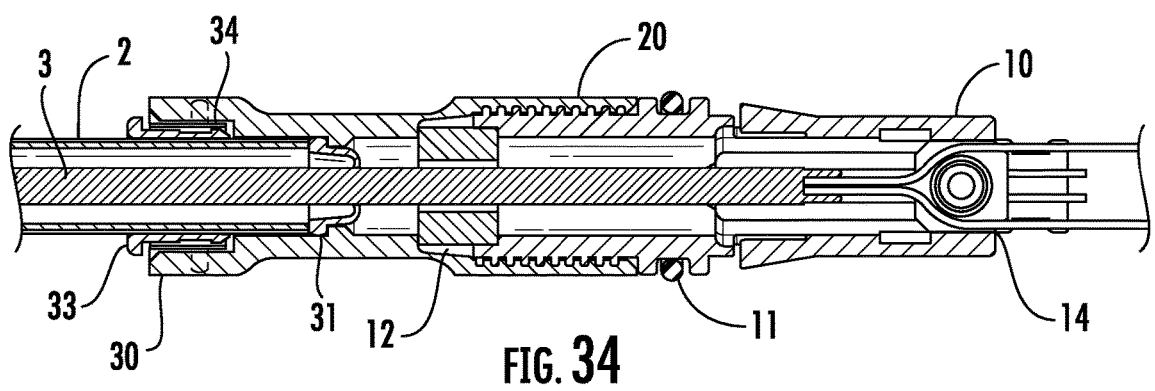

FIGS. 32 to 34 show various views of a third embodiment of the locknut portion and gasblock or waterblock portion being assembled with the inlet portion. These figures show that the locknut portion 20 and gasblock or waterblock portion 30 of the third embodiment is assembled with the inlet portion 10 in the same way as is described in respect of the first and second embodiments.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A cable attachment device for sealing and retaining a communications cable entering a telecommunications closure through an opening defined in the closure, the device comprising:
   a housing having a passage through which the communications cable extends, the housing having a first portion and a second portion;
      wherein the first portion of the housing is configured to receive a protective tube of the telecommunications cable;
      wherein the second portion of the housing is configured to engage with the closure;
   a first seal configured to form a seal between the device and the closure;
   a second seal configured to form a seal between the interior of the device and the protective tube at a first position;
   a third seal configured to form a seal between the communications cable and the interior of the device at a second position longitudinally spaced from the first position;
   a first retaining arrangement configured to couple the device to the closure;
   a second retaining arrangement configured to hold the tube relative to the device; and
   a third retaining arrangement configured to fix the telecommunications cable relative to the device.

2. A cable attachment device according to claim 1, wherein the first seal circumscribes an outer surface of the second portion of the device housing.

3. A cable attachment device according to claim 1, wherein the second seal circumscribes the protective tube.

4. A cable attachment device according to claim 1, wherein the passage of the first portion of the housing is configured to receive the second seal.

5. A cable attachment device according to claim 1, wherein the third seal circumscribes the communications cable.

6. A cable attachment device according to claim 1, wherein the first retaining arrangement is arranged on the second portion of the device housing.

7. A cable attachment device according to claim 6, wherein the first retaining arrangement comprises one or more resilient members that releasably engage with the closure.

8. A cable attachment device according to claim 1, wherein the passage of the first portion of the housing is configured to receive the second retaining arrangement.

9. A cable attachment device according to claim 8, wherein the second retaining arrangement releasably engages with the tube.

10. A cable attachment device according to claim 9, wherein when the second retaining arrangement is engaged, removal of the tube is not possible.

11. A cable attachment device according to claim 10, wherein when the second retaining member is engaged, the tube is able to rotate relative to the device.

12. A cable attachment device according to claim 9, wherein the device further comprises a second retaining member release mechanism which is configured to disengage the second retaining arrangement.

13. A cable attachment device according to claim 12, wherein, when the second retaining arrangement is disengaged, removal of the tube from the device is possible.

14. A cable attachment device according to claim 1, wherein the second retaining arrangement comprises a plurality of spaced apart resilient fingers.

15. A cable attachment device according to claim 1, wherein the protective tube is a duct for blown fiber and the communications cable is installed by being blown through the protective tube by a medium such as air or water.

16. A cable attachment device according to claim 1, wherein when the protective tube of the telecommunications cable is fully received in the first portion of the housing, the protective tube extends only part of the way through the passage of the housing.

17. A cable attachment device according to claim 16, wherein the device housing further comprises a mechanical stop configured to abut an end of the protective tube of the communications cable to prevent the tube from passing all of the way through the passage of the housing.

18. A cable attachment device according to claim 1, wherein the device is configured to seal and retain a communications cable comprising an outer sheath, a strength member and one or more optical fibers, the strength member and the one or more optical fibers being enclosed within the outer sheath, wherein the outer sheath extends through the protective tube, and the third seal engages with the outer sheath.

19. A cable attachment device according to claim 18, wherein when the communications cable is retained by the cable attachment device, the outer sheath of the cable extends only part of the way through the passage of the device housing such that the strength member of the cable and the one or more optical fibers are beyond the extension of the outer sheath.

20. A cable attachment device according to claim 19, wherein the third retaining arrangement is configured to retain the exposed strength member of the cable.

\* \* \* \* \*